United States Patent
Sayyarrodsari et al.

(10) Patent No.: US 10,528,038 B2
(45) Date of Patent: Jan. 7, 2020

(54) OPTIMIZATION-BASED CONTROL WITH OPEN MODELING ARCHITECTURE SYSTEMS AND METHODS

(71) Applicant: ROCKWELL AUTOMATION TECHNOLOGIES, INC., Mayfield Heights, OH (US)

(72) Inventors: Bijan Sayyarrodsari, Austin, TX (US); Celso Axelrud, Round Rock, TX (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 428 days.

(21) Appl. No.: 14/995,977

(22) Filed: Jan. 14, 2016

(65) Prior Publication Data
US 2017/0205813 A1 Jul. 20, 2017

(51) Int. Cl.
*G05B 19/00* (2006.01)
*G05B 19/418* (2006.01)
(Continued)

(52) U.S. Cl.
CPC ..... *G05B 19/41885* (2013.01); *G05B 13/048* (2013.01); *G06F 8/30* (2013.01);
(Continued)

(58) Field of Classification Search
CPC .............................................. G05B 19/41885
See application file for complete search history.

(56) References Cited

U.S. PATENT DOCUMENTS

2005/0187643 A1* 8/2005 Sayyar-Rodsari ... G05B 13/042
700/29

2008/0071394 A1* 3/2008 Turner ................ G05B 13/027
700/31

FOREIGN PATENT DOCUMENTS

GB 2409293 A 6/2005
WO 01/79945 A1 10/2001

OTHER PUBLICATIONS

Sayyar-Rodsari, Bijan et al; "Development of PUNDA (Parametric Universal Nonlinear Dynamics Approximator) Models for Self-Validating Knowledge Guided Modelling of Nonlinear Processors in Particle Accelerators & Industrys;" Oct. 4, 2007; retrieved from internet: https://www.osti.cgov/scitech/servlets/purl/917186.

(Continued)

*Primary Examiner* — Tejal Gami
(74) *Attorney, Agent, or Firm* — Fletcher Yoder, P.C.

(57) ABSTRACT

In one embodiment, a model predictive control system for an industrial process includes a processor to execute an optimization module to determine manipulated variables for the process over a control horizon based on simulations performed using an objective function with an optimized process model and to control the process using the manipulated variables, to execute model modules including mathematical representations of a response or parameters of the process. The implementation details of the model modules are hidden from and inaccessible to the optimization module. The processor executes unified access modules (UAM). A first UAM interfaces between a first subset of the model modules and the optimization module and adapts output of the first subset for the optimization module, and a second UAM interfaces between a second subset of the model modules and the first subset and adapts output of the second subset for the first subset.

21 Claims, 9 Drawing Sheets

(51) Int. Cl.
*G05B 13/04* (2006.01)
*G06F 8/30* (2018.01)
*G06F 17/13* (2006.01)

(52) U.S. Cl.
CPC ............... *G06F 8/31* (2013.01); *G06F 17/13* (2013.01); *G05B 2219/32291* (2013.01); *G05B 2219/39159* (2013.01)

(56) References Cited

OTHER PUBLICATIONS

European Search Report for Application No. EP17150266 dated Nov. 23, 2017, 11 pages.
Qin, S.; Badgwell, T.; "An Overview of Industrial Model Predictive Control Technology," AIChE Symposium Series, 1997.
Qin, S.; Badgwell, T,; "An Overview of Nonlinear Model Predictive Control Applications," 2000.

* cited by examiner

US 10,528,038 B2

OPTIMIZATION-BASED CONTROL WITH OPEN MODELING ARCHITECTURE SYSTEMS AND METHODS

BACKGROUND

The present disclosure relates generally to control systems and, more particularly, to the utilization of models for model-based control and optimization in control systems.

Generally, a control system may facilitate controlling operation of a process, for example, in an industrial plant or an industrial automation system. In some instances, the control system may utilize a model predictive control (MPC) system to optimize performance of the process by generating and manipulating a process model to transition the process from a current operating state to a desired operating state over a control horizon (e.g., future time steps). However, the need for computational efficiency of near real-time optimization may cause the MPC system to significantly simplify the process model to the detriment of the model quality and controller performance. Additionally, typically, the MPC system accesses and/or maintains the models (e.g., mathematical representation of the process), which may not be desirable to certain entities responsible for aspects of the process.

BRIEF DESCRIPTION

In one embodiment, a model predictive control system for an industrial process includes one or more processors to execute an optimization module including an optimization engine configured to determine one or more manipulated variables for the industrial process over a control horizon based on simulations performed using an objective function in conjunction with a computationally optimized process model and to apply the manipulated variables to control the industrial process, to execute a number of model modules including mathematical representations of a response or parameters of the industrial process and the implementation details of the number of model modules are hidden from and inaccessible to the optimization module, and to execute one or more unified access modules (UAM). A first UAM interfaces between a first subset of the number of model modules and the optimization module and adapts output of the first subset for consumption by the optimization module, and a second UAM interfaces between a second subset of the number of model modules and the first subset and adapts output of the second subset for consumption by the first subset.

In one embodiment, a method for controlling operation of an industrial process includes executing, via a control system, an optimization module including an optimization engine configured to determine one or more manipulated variables for the industrial process over a control horizon based on simulations performed using an objective function in conjunction with a computationally optimized process model, and to apply the manipulated variables to control the industrial process. The method also includes executing, via the control system, a number of model modules including mathematical representations of a response or parameters of the industrial process. The implementation details of the number of model modules are hidden from and inaccessible to the optimization module. The method also includes executing, via the control system, one or more unified access modules (UAM). A first UAM interfaces between a first subset of the number of model modules and the optimization module and adapts output of the first subset for consumption by the optimization module, and a second UAM is configured to interface between a second subset of the plurality of model modules and the first subset and adapts output of the second subset for consumption by the first subset.

In one embodiment, a tangible, non-transitory, computer-readable medium storing instructions that, when executed by a processor, cause the processor to execute an optimization module including an optimization engine to determine one or more manipulated variables for an industrial process over a control horizon based on simulations performed using an objective function in conjunction with a computationally optimized process model and to apply the manipulated variables to the industrial process, to execute a number of model modules including mathematical representations of a response or parameters of the industrial process. The implementation details of the number of model modules are hidden from and inaccessible to the optimization module. The instructions, when executed by the processor, also cause the processor to execute one or more unified access modules (UAM). A first UAM is interfaces between a first subset of the number of model modules and the optimization module and adapts output of the first subset for consumption by the optimization module, and a second UAM is interfaces between a second subset of the number of model modules and the first subset and adapts output of the second subset for consumption by the first subset.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
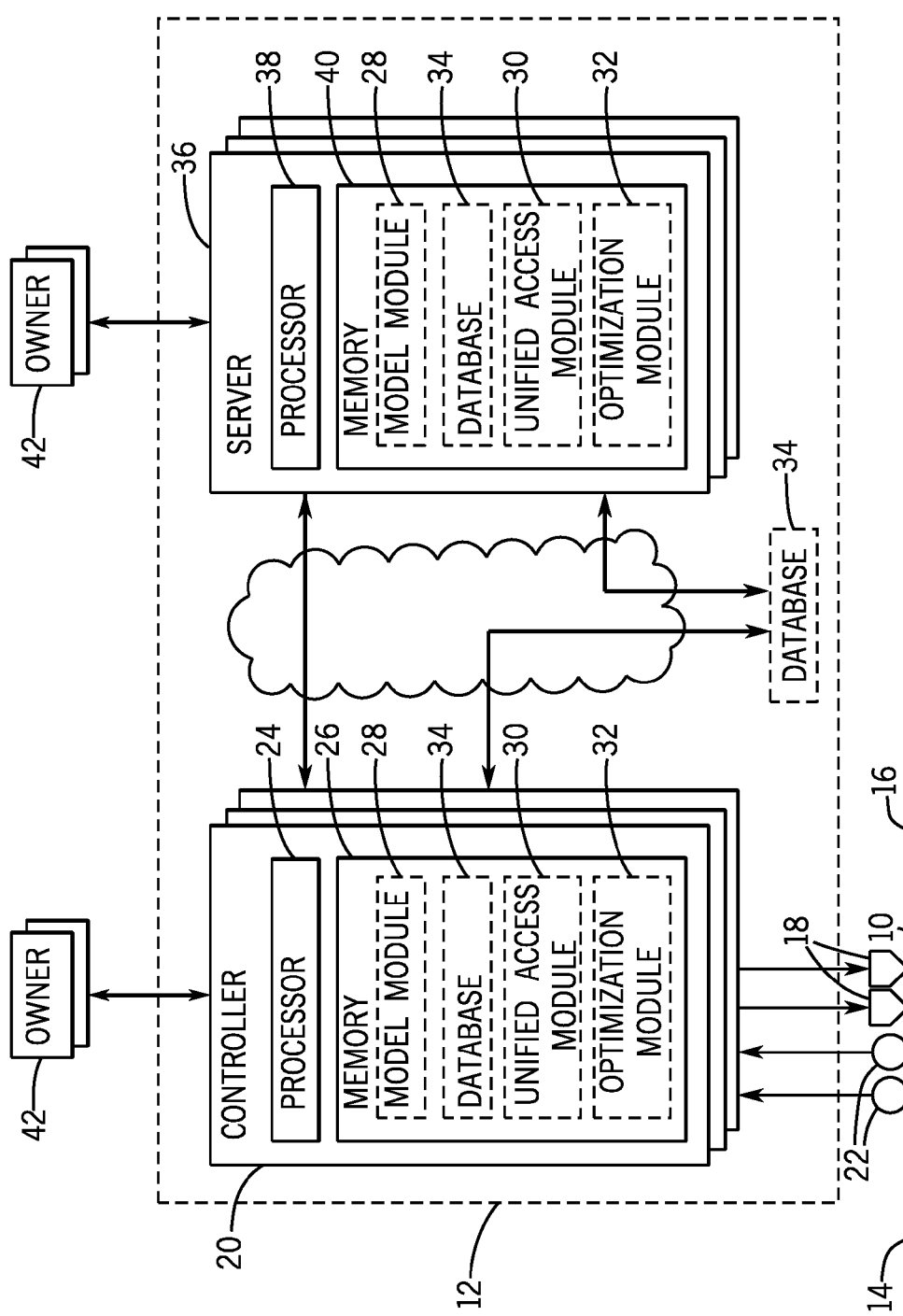
FIG. 1 is a schematic diagram of a process and a control system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Control systems are often used to control operation of a process, for example, in automation systems, automation plants, factories, and the like. Some control systems may include a model predictive control (MPC) control system that uses a model of the process and uses an optimization engine to determine desirable control actions to apply to the process. Given the critical role of the control system, secure, robust, and timely operation of the controller may be desirable in any real-world application of the MPC control system. Typically, a complete process model is made available to the optimization engines used in MPC control systems for a structured search that determines optimal control moves over a desired control horizon. The optimization engine in effect applies candidate moves to the process model to anticipate potential process response and then chooses the moves that result in an anticipated process response that is optimal in some sense.

However, in general, it is desirable for the optimization engine to make computationally efficient control decisions in near real-time. As a result, in some cases, the process models may be significantly simplified to enable the optimization engine to perform in substantially real-time. For example, a nonlinear model may be linearized, or a high order linear model may be approximated with a lower order linear model. Oftentimes, when highly accurate models are desired and used, the execution frequency of the controller employed in the MPC system is kept relatively low (e.g., minutes). Also, the controller performance may depend directly on the model quality.

Accordingly, some embodiments of the present disclosure relate to providing a systematic methodology for decoupling the execution frequencies of the optimization engine and various model modules (e.g., objects) that may process computationally intense equations (e.g., differential equations). Additionally, some embodiments enable an open modeling architecture where the optimization engine does not have a complete definition of the process model. One solution that removes the complete model definition from the optimization engine is described in detail in U.S. Patent Application Publication No. 2014/0128996, which is incorporated herein by reference in its entirety for all purposes.

However, the present disclosure extends the concept to enable various model owners (e.g., entities within a business) to own and maintain their respective model in a modeling language (e.g., C, C++, Python, Matlab) that is most appropriate for that particular model module. The owners of the models may maintain the responsibility for the model quality/validity in the modeling language of their choosing without any constraint imposed by how the model module interfaces to the other model modules and/or the MPC controller. The details of the models are hidden from the optimization engine. This is in contrast to a central authority that is responsible for building models for the controller. Instead, in some embodiments, the open modeling architecture may use unified access protocols, referred to as "unified access modules (UAMs)" herein, that interface with and function as adapters for the various model modules. For example, the UAMs may adapt the output from the disparate model modules and provide the adapted output to the optimization engine, other model modules, and so forth.

Models of physical processes may be broadly categorized as first-principles (phenomenological, physical, mechanistic) or empirical (statistical, data-centric). A first-principles (FP) model commonly consists of a set of equations describing known relationships among the variables, with coefficients or other parameters that may be fitted to data. Empirical models presume no particular form for the relationships, and instead fit input/output models from data alone. Neural networks (NN) models, which employ a large number of parameters in a universal approximation structure, are one of the most widely used forms of nonlinear empirical modeling methods due to their many favorable properties. In some embodiments, the model modules may include parametric hybrid models that combine the two modeling approaches. That is, the parametric hybrid models may include steady-state and/or dynamic models whose parameters are also described as models. For example, the parametric hybrid models may include using parametric input/output or state space dynamic models in the form of a system of continuous differential equations or discrete difference equations, and the parameters may be static mappings captured by neural networks (e.g., using empirical data) to enable fast updating to the parametric hybrid models. Further, each of the models may be expressed in modeling languages that are suitable for the intended purpose of the models. In this way, the models may be computationally optimized and are not limited by a particular modeling language that is uniformly applied regardless of the function of the model.

More specifically, an example of the input/output models may include a discrete difference equation, such as $y_k = -a_1 y_{k-1} + b_1 u_{(k-D)}$, where D is the delay and $a_1$ and $b_1$ are the discrete model parameters usually determined through empirical modeling techniques. Another example may include a transfer function model, such as a first order transfer function defined as $Y(s)/U(s) = K/(Tau\ s+1)$ described in more detail below, where K may be a gain function or a steady state model.

An example of the state space model may include a linear discrete state space model where a state equation is defined as $x_k = Ax_{(k-1)} + Bu_k$, and an output equation is defined as $y_k = Cx_{(k)} + Du_k$. Here, $x_k$ is the state vector at time k, $u_k$ is the input vector at time k, and $y_k$ is the output vector at time k. Further, A, B, C, and D are matrices of appropriate dimensions.

The UAMs may provide data points to the optimization engine at various times based on the output of the various model modules. In addition to adapting the output of the model modules, the UAMs may perform functionality including performing model reduction that includes an explicit optimization to reduce model order, automatically generating code that represents a model and a specific solver, as opposed to a general solver, for the model to be used by the optimization engine (e.g., code that optimizes the optimization engine), constructing a mathematical model using the output from the model modules, sending data point information to the optimization engine, another model module, and/or a database, and so forth. The use of databases in optimization-based control is described in more detail in U.S. Application Publication No. 2015/0134647, which is incorporated herein by reference in its entirety for all purposes. The UAMs may provide the data points on demand, at a periodic time interval, when a flag is set, when a tolerance change that meets a certain threshold has been detected, and the like. The optimization engine may use the data points to approximate the process model and generate a surface to simulate control actions to determine which control actions result in a desired state of the process. Then, the determined optimal control actions may be applied to control the process.

Using the open modeling architecture, a large number of equations or complex computations may be processed by the model-based controller without the expensive online computations negatively impacting the execution frequency of the controller. More specifically, if a parametric hybrid model module relies on expensive time consuming computations to generate its output (e.g., using a nonlinear optimization to solve a set of implicit equations), then the execution frequency of the main computation loop for the controller can be decoupled from the execution frequency for the computations in that model module. Thus, the controller may use data points previously obtained or accessible via the database to make control action decisions by perturbing a rigorously defined model without having to wait on the model modules to finish processing before making a decision. However, whenever new data points are generated by the model modules, the data points may be provided to the controller so that a new surface may be generated with the new data points. Further, ownership of the model modules and the environment in which the model modules are defined may be independent from one another. In this way, the owner of the model module may define the model in any modeling language that is appropriate and does not have to conform to a uniform modeling language or environment. This feature may also enable completely securing the details of the models from all other components in the architecture while enabling the model's use for online computation. As such, industries, such as pharmaceutical, among others, with sensitive intellectual property (IP) may benefit by concealing proprietary information in their privately owned and independently maintained models.

It should be appreciated that the presently disclosed subject matter may enable deployment of distributed (e.g., cloud-based) model-based control systems in a robust and scalable manner for real-world problems with significant size and complexity. In some embodiments, the model-based control systems may use explicit and/or implicit methods to perform the simulations of the process to obtain numerical solutions used to determine control actions. The techniques described herein may also enable processes to be modeled and controlled with faster nonlinear dynamics than is currently available for existing nonlinear control systems.

FIG. 1 is a schematic diagram of a process 10 and a control system 12, in accordance with embodiments presented herein. In some embodiments, the process 10 may be any conceivable type, such as a manufacturing process, a steady state process, a batch process, a chemical process, a material handling process, an energy utilizing process, an energy production process, or any combination thereof.

Thus, as depicted, the process 10 may receive one or more inputs 14 used to produce one or more outputs 16. For example, the inputs 14 may include feed stock, electrical energy, fuel, parts, assemblies, sub-assemblies, or any combination thereof. Additionally, the outputs 16 may include finished products, semi-finished products, assemblies, manufacturing products, by products, or any combination thereof.

To produce the one or more outputs 16, the control system 12 may control operation of the process 10. More specifically, the control system 12 may control operation by outputting control signals to instruct one or more components 18 to implement control actions (e.g., manipulated variable setpoints). The control system 12 may be coupled to the components 18 via any suitable network (e.g., Internet, DeviceNet, Ethernet/IP, ModBus, ProfiBus). In some embodiments, the components 18 may include controllers, input/output (I/O) modules, motor control centers, motors, human machine interfaces (HMIs), operator interfaces, contactors, starters, drives, relays, protection devices, switchgear, compressors, scanners, gauges, valves, flow meters, and the like. For example, the control system 12 may instruct a motor (e.g., a component 18) to actuate at a particular speed (e.g., a manipulated variable setpoint).

As depicted, the control system 12 may include one or more interrelated controllers 20. The controllers 20 may determine the manipulated variable setpoints based at least in part on operational parameters (e.g., temperature, pressure, electrical power, or flow rate) determined via one or more sensors 22. More specifically, the sensors 22 may communicate measurement signals informing the control system 12 of the determined operational parameters. For example, a temperature sensor 22 may inform the control system 12 regarding temperature (e.g., an operational parameter) of a motor (e.g., a component 18). In fact, in some embodiments, the operational parameters may include information enabling the control system 12 to determine a current operating state of the process 10 (e.g., current manipulated variables and/or controlled variables).

In some embodiments, the controllers 20 may employ the computing power of other controllers 20 to perform functions. For example, a first controller (e.g., a hybrid model predictive controller, for which the decision variables include both integer and continuous variables and the search process solves a mixed integer linear or nonlinear programming problem) may utilize a second controller to determine a search result for a first optimization search branch and a third controller to determine a search result for a second optimization search branch. The first controller may then compare the search results returned by the second and third controllers to select the better (e.g., less costly) search result as the criterion for its branching function in the course of its mixed integer linear or nonlinear optimization.

Furthermore, the controllers 20 employed by the control system 12 may facilitate enabling different types of control schemes. For example, the control system 12 may include one or more model predictive control (MPC) controllers 20, one or more proportional-integral-derivative (PID) controllers 20, one or more neural network controllers 20, one or more fuzzy logic controllers 20, or any combination thereof. Generally, in each of the various control schemes, the control system 12 may determine manipulated variable setpoints based at least in part on tuning parameters. For example, in a PID control system, the control system 14 may utilize tuning parameters, such as a proportional gain, an integral gain, and a derivative gain. Additionally, in a MPC control system, the control system 12 may utilize tuning parameters in an objective function to weight aspects of the process 10. For example, the tuning parameters may weight deviation of a controlled variable from a desired value, deviation of a manipulated variable form a desired value, and change in the manipulated variable. To simplify discussion, the techniques described herein will be described in regard to a model predictive control system 12. Generally, a model predictive control system 12 may determine manipulated variable setpoints accounting for operation of the process 10 over a control horizon (e.g., manipulated variable trajectories and/or controlled variable trajectories over future time steps).

The controllers 20 may include a processor 24 and memory 26 to facilitate performing operations, such as determining manipulated variable setpoints and/or determining a current operating state of the process 10 by generating a computationally optimized process model (COPM) and performing simulations on the COPM. That is, the processor 24 may execute instructions and/or process data stored in memory 26. As such, the processor 24 may include one or more general purpose microprocessors, one or more application specific processors (ASICs), one or more field programmable logic arrays (FPGAs), or any combination thereof.

Additionally, the memory 26 may include random access memory (RAM), read only memory (ROM), rewritable flash memory, hard drives, optical discs, and the like. In some embodiments, the memory 26 may store instructions for one or more model modules 28 (e.g., parametric hybrid models, parameter models), unified access modules (UAMs) 30, and/or an optimization module 32.

As briefly noted above, the UAMs 30 may function as interfaces between various modules. For example, the UAMs 30 may function as the interface between the optimization module 32 and the model modules 28 and/or between the various model modules 28 that depend on each other. In particular, the UAMs 30 may enable the optimization module 32 to make requests for new data points from various model modules 28 without knowing anything about the actual models themselves. This may be in part due to the UAMs 30 functionality to receive the request from the optimization module 32 and make the function call to the particular model module 28. When the model module 28 provides a response including data points or other information, the UAM 30 may include logic to adapt the returned data for the requestor's consumption. In some embodiments, the UAMs 30 may be enabled to approximate the model that the particular model modules 28 use based on the returned data and provide that approximation to the optimization module 32 and/or other model modules 28. More details regarding the UAMs 30 are discussed below.

In some embodiments, the optimization module 32 may include an optimization engine and a computationally optimized process model (COPM). The optimization engine may be responsible for performing searches/simulations using the COPM to determine manipulated variables to apply to the process 10. That is, the optimization module 32 may be the only portion of the control system 12 that makes decisions regarding what control actions to apply to the process 10. One of the UAMs 30 may provide data points, optimized code, and/or approximated models to the optimization module 32, and the optimization module 32 may process the information to determine one or more optimal control actions in substantially real-time. In some embodiments, the optimization module 32 may have an execution frequency that is independent of the execution frequency of the model modules 28. That is, complex equations that take an extended period of time to process may be run in the background while the optimization module 32 continues to make decisions based on data already possessed, and, when the model modules 32 eventually converge on data points or finish process, the output may be provided to the optimization module 32 via one of the UAMs 30. It should be appreciated that, if the various model modules 28 fail to converge on a surface approximation, the optimization module 32 run by the controller 20 may not be affected because its execution is independent of the model modules 28.

Further, the memory 26 may include an embedded database 34 used to store inputs/outputs to the UAMs. Storing the input/output of the UAMs 30 to an in-memory database 34 enables several functionalities. For example, in some embodiments, the UAMs inputs/outputs may be committed to the embedded database 34 by default at the execution frequency of the control system 12. In some instances, an intelligent communication protocol between modules (e.g., model modules 28, UAMs 30, optimization module 32) of the control system 12 may be used to, for example, only initiate data flow when the data has changed. Also, multi-user access to the embedded database 34 may be enabled by using various executables within the same processor 24 or within the different cores of a multi-core processor 24. In some embodiments, asynchronous commitment of subsets of the UAMs inputs/outputs to the embedded database 34 may be enabled. In such instances, the database 34 may be responsible for validating the consistency of the data. Further, diagnostics/performance monitoring may be performed using stored data in the database 34 or any backed-up data that has been committed to another storage device (e.g., on-disc database). For example, the data may be analyzed to determine when manipulated variable setpoints resulted in an actual operating state that was different than the desired operating state and the reason for the variance may be determined by looking at the inputs/outputs and/or other parameters. In addition, the UAMs 30 may be adapted in runtime or offline by using feedback from controller performance that is gleaned by analyzing data stored in the database 34.

As depicted, the controllers 20 may be in communication with one or more servers 36. Additionally, the connection between the controllers 20 and/or the servers 36 may be wired (e.g., Ethernet) or wireless (e.g., WiFi, Bluetooth®, ZigBee) and may use any suitable network (e.g., Internet). As depicted, the servers 36 may generally include the similar components to the controllers 20. For example, the servers 36 may include one or more processors 38 and memories 40. Additionally, the processors 38 may execute the various modules (e.g., model modules 28, UAMs 30, optimization module 32) stored on the memories 40. In preferred embodiments, the optimization module 32 resides on the controller 20 in direct communication with the components 18 of the process 10, but, in the depicted embodiment, the optimization module 32 is shown as being optionally stored on the memories 40 of the server 36 to not limit the disclosure. In embodiments where the optimization module 32 is executed by the processor 38 of the server 36, the determined manipulated variable setpoints may be communicated to the controller 20 to be applied to the process 10.

In some embodiments, the execution of the control system 12 may be distributed. For example, in one embodiment, each model module 28, UAM 30, and/or optimization module 32 may be executed on a dedicated core of a multi-core processor 24 and/or 38 on the one or more controllers 20 and/or servers 36, respectively. Additionally or alternatively, the model modules 28, UAM 30, and/or optimization module 32 may be executed by a dedicated processor 24 or 38. For example, the parameter models may be execute by the processor 38 of a server 36 running in a control room of a plant, while the parametric hybrid models execute on an enterprise level server 36 that includes sufficient computational resources to monitor/maintain the models. The optimization module may run on the processor 24 included in one of the controllers 20. Also, a UAM 30 that functions as an interface between the optimization module 32 and some of the model modules 28 (e.g., parametric hybrid models) may be executed by the processor 24 of the same controller 20 that executes the optimization module 32, a processor 24 of another controller 20, or by the processor 38 of one of the servers 36. Likewise, another UAM 30 that functions as an interface between the model modules 28 (e.g., between the parametric hybrid models and the parameter models) may be executed by the processor 24 of the same controller 20 that executes the optimization module 32, a processor 24 of another controller 20, or by the processor 38 of one of the servers 36.

By decoupling the execution frequency of the optimization module 32 making control decisions from the execution frequency of the model modules 28, the controller 20 may continue to determine control actions to implement without having to wait for the model modules 28 to finish processing. As should be understood, using the UAMs 30 to interface between the model modules 28 and between the model modules 28 and the optimization module 32 may enable the model modules 28 to be maintained by an owner 42 (e.g., dedicated entity) that is solely responsible for that particular model. Thus, the owner 42 may develop the model module 28 in any modeling language that is appropriate or desirable for that particular model. Also, the disclosed open modeling architecture enables completely securing the details of the respective models from all other components in the architecture while enabling its use for online computations. As a result, centralized ownership of the model modules 28 may be dispensed, and each model module 28 can be monitored, maintained, and/or modified by the owner 42 that is expert in the domain using a modeling language that is most convenient to the owner 42 and appropriate for the model. Further examples and discussion regarding the open modeling architecture is discussed below with reference to FIGS. 3-5.

In some embodiments, information, such as inputs/outputs of the UAMs 30, data points determined by the model modules 28, or both, may be stored in a database 34 remote to both the controllers 20 and the servers 36. As such, the controllers 20 and the servers 36 may be communicatively connected (wired or wirelessly) to the remote database 34, which may reside in a server in the plant, in a location away from the plant, or in any suitable location.

Figure 2A:
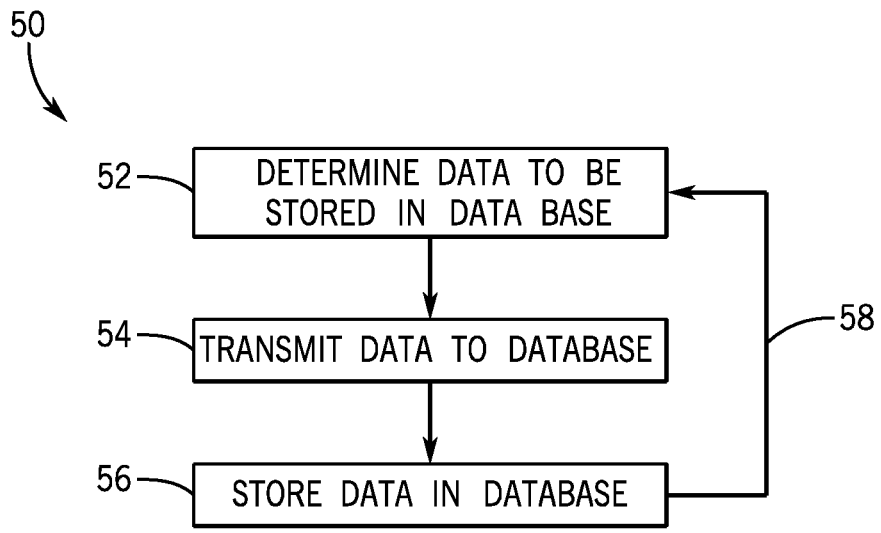
FIG. 2A depicts a flow chart of a general process for storing data in a database.

FIG. 2A depicts a flow chart of a general process 50 for storing data in the database 34. As depicted, the process 50 may begin by determining data to be stored in the database 22 (process block 52). For example, a first controller 20 may gather an operational parameter (e.g., temperature) from a sensor monitored by the controller 20. The data may then be transmitted to the database 34 (process block 54). For example, the first controller 20 may transmit the data over the network or bus that communicatively couples the first controller 20 and the database 34. The database 34 may then store the data in the database 34 (process block 56). In some embodiments, the first controller 20 may specify a memory address at which to store the data. Additionally, the UAMs 30 may store inputs/outputs in the database 34. For example, inputs may include data points of a surface received from the model modules 28, and outputs may include adapted data points, models generated by the UAMs 30 based on the data points, and/or optimized code to solve the model (e.g., specific solver).

Additionally, the process 50 may be periodically (e.g., cyclically) repeated (represented by arrow 58). In other words, data stored in the database 34 may be periodically updated, which may include overwriting or adding to previously stored data, which may facilitate diagnostics. For example, the first controller 20 may periodically add to the operational parameter stored in the database 34 to provide a historical view of the changes in the operational parameter and/or the UAMs 30 may add to its inputs/outputs stored in the database 34. In some embodiments, the periodic updating 58 may be based on a timer. In other embodiments, the periodic updating 58 may be based on a triggering event, such as a change in the operational parameter monitored by the first controller 20 and/or a change in the input/output of the UAM 30.

As can be appreciated, each of the controllers 20 and/or servers 36 in the control system 12 may utilize process 50 to write data to the database 34. In some embodiments, the updating frequency of the controllers 20 may vary. For example, the first controller may update a flow rate of a pipe every 5 millisecond to account for rapid changes in the flow rate, whereas a second controller may update temperature of a boiler every 5 seconds due to the slower changes in temperature.

Figure 2B:
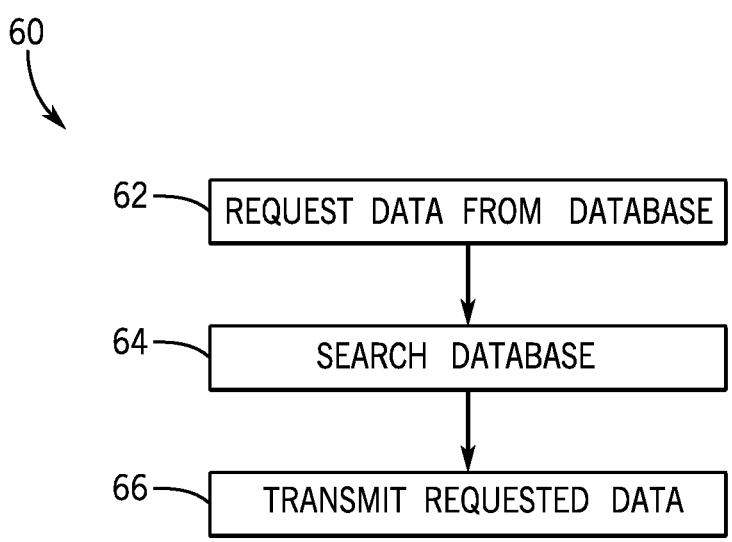
FIG. 2B depicts a flow chart of a general process for retrieving data from the database, in accordance with embodiments presented herein.

On the other side, FIG. 2B depicts a flow chart of a general process 60 for retrieving data from the database 34, in accordance with embodiments presented herein. As depicted, the process 60 may begin by requesting data from the database 34 (process block 62). For example, a second controller may request the operational parameter stored in the database 34 by the first controller, or the controller 20 may request the output of the UAM 30 stored in the database 34 in order to generate the computationally optimized process model (COPM). Depending on the functionality of the database 34, the second controller may request the operational parameter with varying levels of specificity. For example, the second controller may simply request a particular operational parameter, specify operational parameters gathered by the first controller, or specify the memory location within the database 34 utilized by the first controller.

The database 34 may then search for the requested data (process block 64). If the requested data is found, the database 34 may transmit the requested data (process block 66). For example, the database 34 may transmit the requested data over the network or bus that communicatively couples the database 34 and the second controller. In some embodiments, if the requested data is not found, the database 34 may return an error message. Thus, by utilizing process 50 and process 60, data from the first controller may be communicated to the second controller via the database 22. Additionally, data from the UAMs 30 may be communicated to any of the controllers 20 and/or servers 36.

Figure 3:
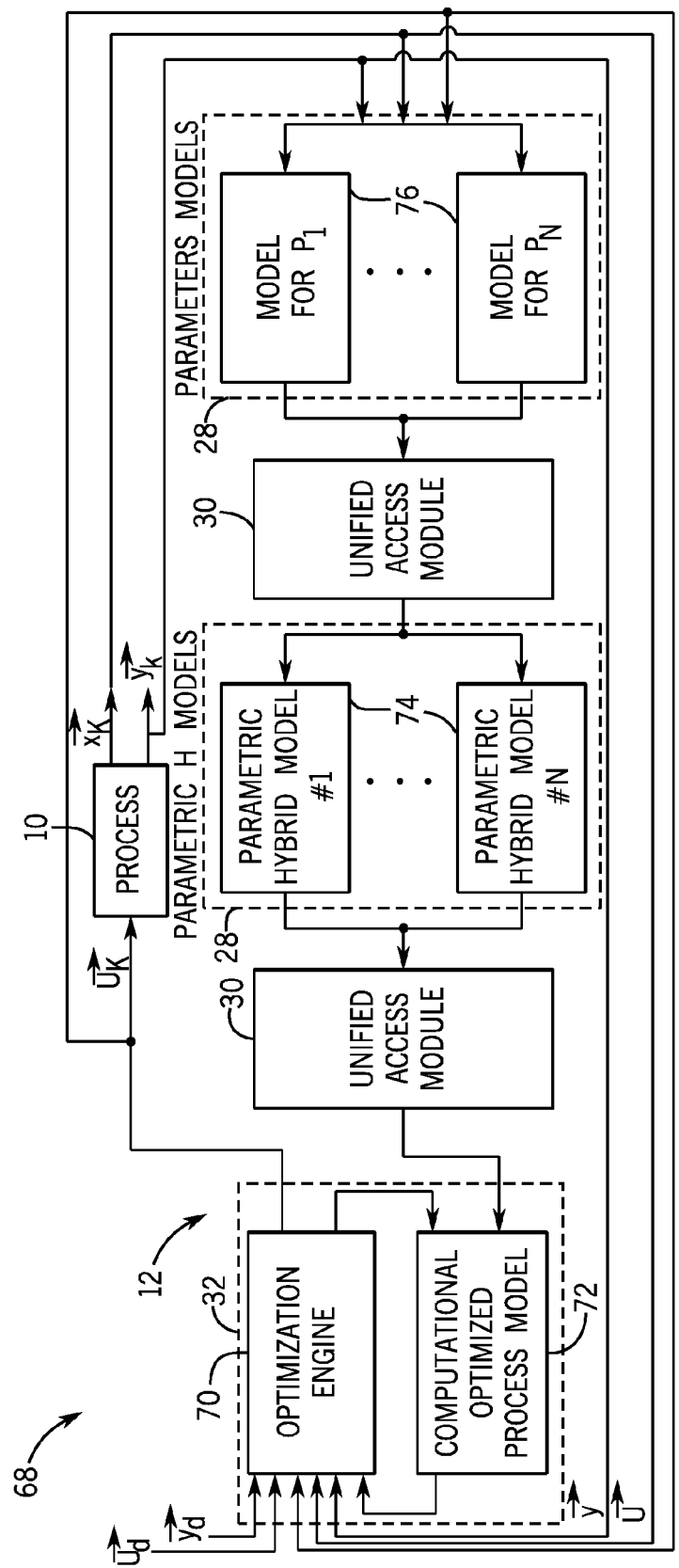
FIG. 3 is a block diagram of an open modeling architecture including a discrete or continuous state space model instead of a process model that is used by the control system of FIG. 1, in accordance with embodiments presented herein.

FIG. 3 is a block diagram of an open modeling architecture 68 including a discrete model or continuous state space model instead of a process model that is used by the control system 12 of FIG. 1, in accordance with embodiments presented herein. As depicted, the control system 12 may include the optimization module 32, two unified access modules (UAMs) 30, model modules 28, and the process 10, which may be represented by a discrete state space model or a continuous model. The optimization module 32 may be the only module that makes decisions regarding control actions to apply to the process 10 and/or components 18. In particular, the optimization module 32 may include an optimization engine 70 and a computationally optimized process model (COPM) 72. The COPM may include a rigorous definition of a model that is perturbed to generate a surface that represents a valid approximation and is used by the optimization engine 70 to determine control actions (e.g., manipulated variable setpoints) to apply to the process 10 to achieve a desired operating state.

The optimization engine 70 may generate the COPM 72 based on data points and/or models received output by parametric hybrid models 74 from a first UAM 30 that interfaces with the optimization module 32 and the parametric hybrid models 74. Further, the parametric hybrid models 74 may receive parameters output by parameter models 76 from a second UAM 30 that interfaces with the parametric hybrid models 74 and the parameter models 76. The UAMs may be used to manage the connectivity between the parameter models 76 and the parametric hybrid models 74, as well as the connection between the parametric hybrid models 74 and the COPM 72 used in the optimization module 32. It should be noted that the UAM 30 between the parameter models 76 and the parametric hybrid models 74 may not be the same as the UAM 30 between the parametric hybrid models 76 and the COPM 72. In some embodiments, the UAM 30 may be a function call requesting point information from the models, which may be used to construct a mathematical model that may be sent to the model module 28 receiving the information.

As depicted, any number of parametric hybrid models 74 and parameter models 76 may be used. It should be understood that the parametric hybrid models 74 and the parameter models 76 may be developed in any desired modeling language. Indeed, the different models may be written in different modeling languages and may function together by integrating via the UAMs 30. Also, the execution frequency of the parametric hybrid models 74 and the parameter models 76 may be separate from the execution frequency of the optimization module 32. Thus, if a complex parametric hybrid model 74 that relies on time consuming computations to generate its output (e.g., using a nonlinear optimization to solve a set of implicit equations), then the execution frequency of the main computation loop in the optimization module 32 may be decoupled from the execution frequency for the computations in that model module 28.

Accordingly, the control loop may run on a much faster frequency, receiving model updates from the computationally expensive model modules 28 at a lower update rate or when a flag is set to indicate the completion of the computations in the computationally expensive model modules 28. The UAMs 30 may contain functionality to ensure that the model updates do not create unstable controller 20 behavior (e.g., by imposing a rate of change limit on the variation of model parameters). Additionally, in the open modeling architecture depicted, model parameters may be constrained to ensure stable and robust online modification. Also, the internal state variables of various models (parametric hybrid models 74 and/or parameter models 76) may be made available to other models. For example, in the case of nonlinear integrating systems or differential equations, the states may be approximated and accessible to be used by other models. It should be noted that the parametric hybrid models 74 and/or the parameter models 76 may be predictive by generating an approximation over a desired prediction/planning/control horizon of interest.

Each parametric hybrid model 74 may capture some aspect of the process 10 response. For example, each cell in a multi-input/multi-output system can be represented by a parametric hybrid model 74 module 28 that captures the dynamic relationship between that input/output pair. In such case, while one parametric hybrid model 74 is a parametric difference equation, another parametric hybrid model 74 may be a continuous state-space model with one input, one output, and a number of state variables. It should be noted that the parametric hybrid models 74 and/or the COPM may be dynamic or steady state. In one example, as mentioned above, a parametric hybrid model 74 may be represented as: $Y(s)/U(s)=K/(Tau\ s+1)$. In this equation, K is a gain function (steady state model), Tau is residence time for a first ordered system, s is a laplace parameter. Both Tau and K may be modeled by separate parameter models 76.

The parameter models 76 may capture the dependency of parameters in the parametric hybrid models 74 on process input, output, and/or state. For instance, one parameter model 76 may be a mass/energy balance (a first-principles model) while another parameter model 76 may be an empirical model (e.g., a neural network) that is either trained a priori or is being trained based on more recent process data. Additionally, a parameter model 74 may be a gain function, which is a steady state model for the system. In another example, a parameter model 76 may be a time delay, which represents a dynamic model parameter for the system. To illustrate one example of how the model modules 28 work together via the UAMs 30, imagine that one parameter represents a catalyst and the owner of the catalyst provides a model of how the catalyst may change in the process 10. In some instances, the catalyst parameter may be utilized in a parametric hybrid model 74, which may use the information about the catalyst parameter. However, the owner of the catalyst parameter model 76 may not wish to disclose the actual model itself. Thus, the UAM 30 may extract information out of the catalyst parameter model 76 without revealing internal details related to the model. In this way, the UAMs 30 may function as abstraction layers in the open modeling architecture 68.

In the depicted embodiment, vectors u and y are inputs to the system. The input vectors may be considered current input values (e.g., states, times) to the system or trajectory of decisions for the system. When the inputs are entered into the model modules 28, trajectories, states, and/or dynamics may be output to the optimization module 32. In some embodiments, a general discrete state space model may be used for the process 10 and the output are the vectors x and y, which represent an internal state of the process 10. The discrete state space model may be represented as: $x_{k+1}=A_k x_k + B_k u_k$ and $y_k = C_k x_k + D_k u_k$. It should be noted that $A_k$, $B_k$, $C_k$, and $D_k$ may be functions of vector u or state $x_k$. In addition, index "k" may be dropped to refer to a continuous domain description represented as: $x=Ax+Bu$ and $y=Cx+Du$.

As may be seen, output vectors x (e.g., state) and y from the process 10 may feed into the parameter models 76 and the optimization engine 70. Further, input vector u may also feed into the parameter models 76 and the optimization engine 70. Using the inputs, outputs, and/or states, the optimization engine 70 may generate a surface and determine manipulated variable setpoints (e.g., a trajectory of control actions) to arrive at desired operating states using the COPM 72.

Figure 4:
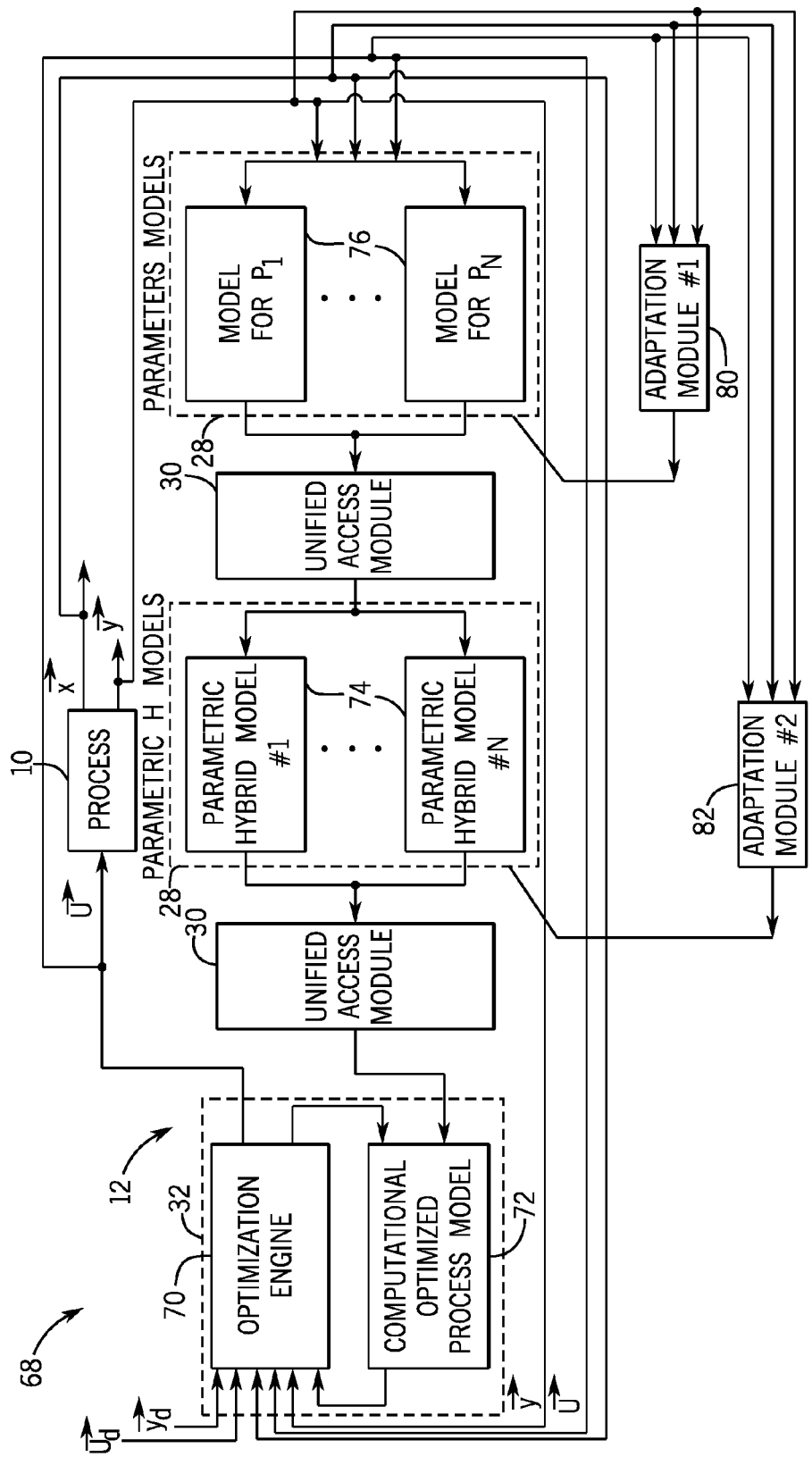
FIG. 4 is a block diagram of the open modeling architecture including a first and second adaptation module that are used by the control system of FIG. 1, in accordance with embodiments presented herein.

FIG. 4 is a block diagram of the open modeling architecture 68 including a first and second adaptation module 80 and 82 that are used by the control system 12 of FIG. 1, in accordance with embodiments presented herein. As depicted, the open modeling architecture 68 may include many similar aspects as shown in FIG. 3. For example, the open modeling architecture 68 in FIG. 4 may include the optimization module 32, two unified access modules (UAMs) 30, model modules 28, and the process 10. Further, the optimization module 32 may use an optimization engine 70 to determine control actions (e.g., manipulated variable setpoints) to apply to the process 10 to achieve a desired operating state using the COPM 72.

Further, as illustrated, the first adaptation module 80 may be connected to each one of the parameter models 76 and the second adaptation module 82 may be connected to each one of the parametric hybrid models 74. Further, the adaptation modules 80 and 82 may be fed input vector u, state vector x, and output vector y. The first adaptation module 80 may modify the parameter models 76 as a function of current and/or predicted values for the input, output, and/or state. The second adaptation module 82 may modify the parametric hybrid models' structure, parameters, or both. It should be noted that the inclusion of the adaptation modules 80 and 82 may not break the flow of operation of the control system 12.

In some embodiments, the COPM 72 may probe the UAM 30 for desired information to construct the internal model that will be used by the optimization engine 70. Further, the optimization engine 70 may also request and/or receive any desired information from the UAM 30. Once the COPM 72 receives the desired information, the COPM 72 may read the information and construct a convex approximation of the model. The optimization engine 70 may run one or more searches using the COPM 72 to find manipulated variable setpoints (e.g., control actions) that minimize an objective (e.g., cost) function including parameters used to formulate the objective function. As a result, the process 10 may maintain stability because the search was performed in a well-defined convex space defined in the COPM 72. That is, the controller 20 may select control actions that do not violate constraints included in the process 10. Once the manipulated variable setpoints are selected, the manipulated variable setpoints may be applied to the process 10, and the output from the process 10 may flow through the parameter models 76 and parametric hybrid models 74 to produce new parameter models 76 and parametric hybrid models 74. It should be noted that in some embodiments, the parameter models 76 and parametric hybrid models 74 may be defined once and the controller 20 executing the optimization module 32 may probe the model modules 30 once or repeatedly to obtain the same information. The adaptation modules 80 and 82 may receive inputs/outputs of the parameter models 74 and/or parametric hybrid models 76 and modify and/or maintain the parameter models 74 and/or parametric hybrid models 74.

Figure 5:
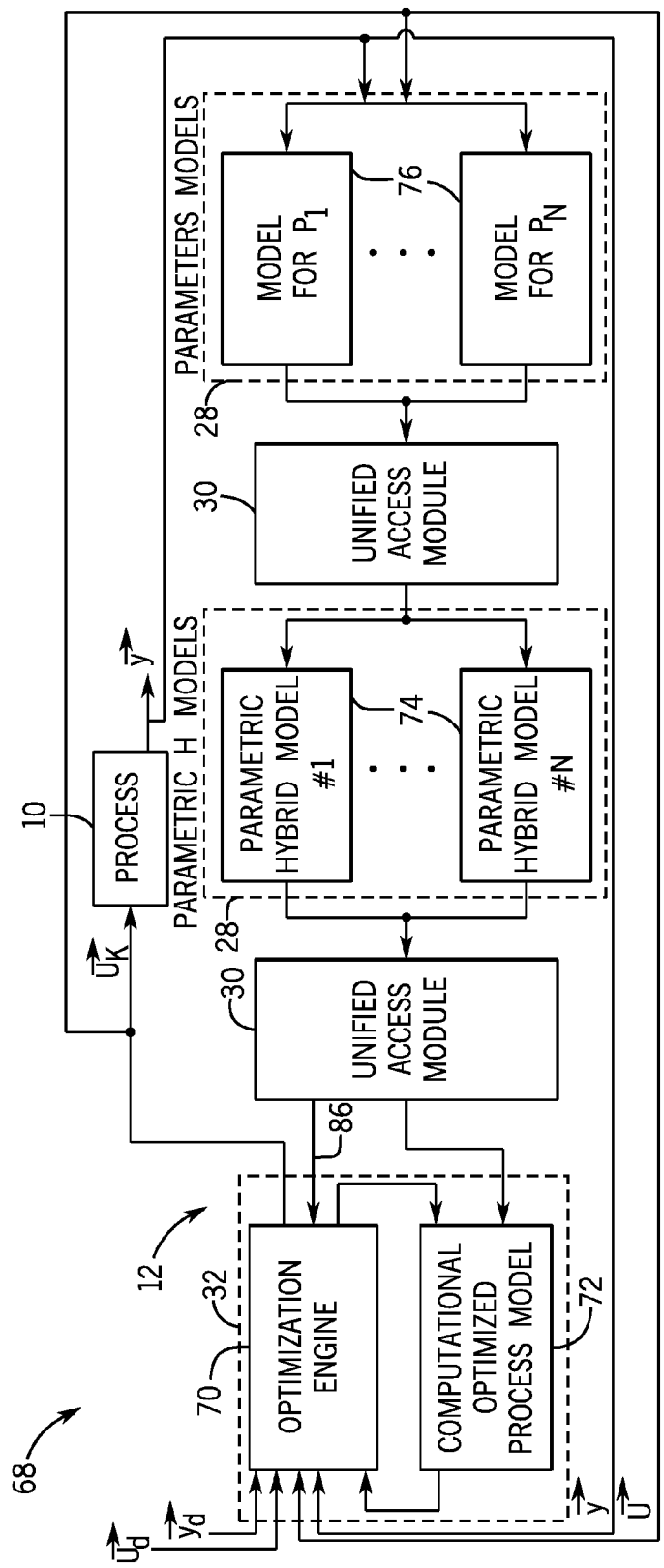
FIG. 5 is a block diagram of the open modeling architecture used to generate code that optimizes an optimization engine of the control system of FIG. 1, in accordance with embodiments presented herein.

FIG. 5 is a block diagram of the open modeling architecture 68 used to generate code that optimizes the optimization engine 70 of the control system 12 of FIG. 1, in accordance with embodiments presented herein. As depicted, the open modeling architecture 68 may include many similar aspects as shown in FIGS. 3 and 4. For example, the open modeling architecture 68 in FIG. 5 may include the optimization module 32, two unified access modules (UAMs) 30, model modules 28, and the process 10. Further, the optimization module 32 may use an optimization engine 70 to determine control actions (e.g., manipulated variable setpoints) to apply to the process 10 to achieve a desired operating state using the COPM 72. However, the open modeling architecture 68 displayed in FIG. 5 may include functionality to generate optimized code to enable optimized runtime execution of the optimization module 32.

For example, in the depicted embodiment, the UAM 30 may generate an application specific optimization problem formulation and a corresponding optimized solver that exploits the specific optimization problem formulation for maximum efficiency and minimal software footprint (e.g., especially for embedded solutions on controllers 20). As shown by arrow 86, the optimized code generated by the UAM 30 may be provided to the optimization engine 70 to optimize the optimization engine 70. Rather than generating a general solver that may be comprehensive and not computationally efficient, the UAM 30 in the depicted embodiment may produce specialized code that is designed to be computationally efficient to be used by the optimization engine 70 with the COPM 72. In some embodiments, there may be different code generated for different vertical markets depending on the type of process 10.

Figure 6:
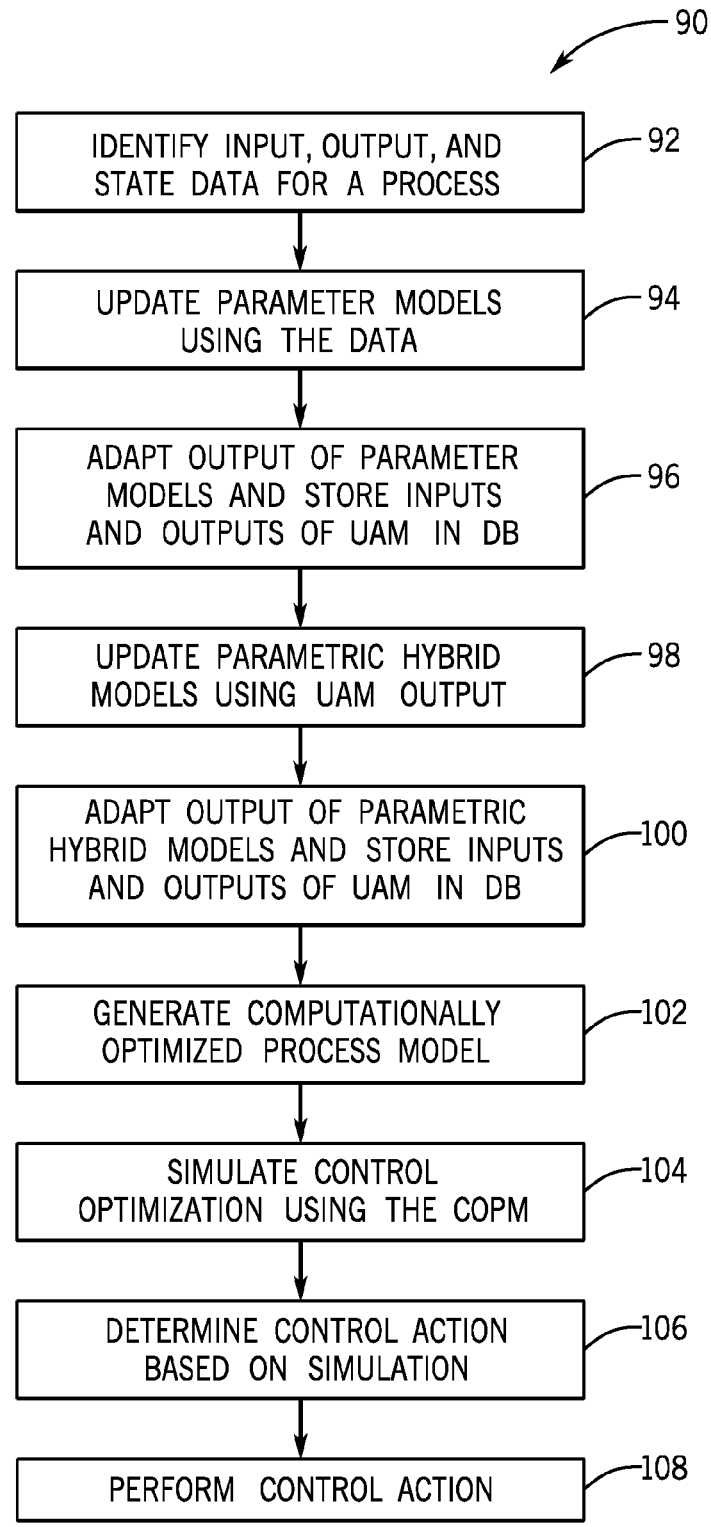
FIG. 6 is a flow diagram of a method for controlling the operation of the process of FIG. 1 by executing distributed optimization-based control, in accordance with embodiments presented herein.

FIG. 6 is a flow diagram of a method 90 for controlling the operation of the process 10 of FIG. 1 by executing distributed optimization-based control, in accordance with embodiments presented herein. In some embodiments, the distributed optimization-based control may use one or more independently controlled model modules 28 and the UAMs 30 from the open modeling architecture 68 described above. The method may be implemented as computer instructions stored on one or more computer readable mediums and executed by one or more processors 24 and/or 38. That is, various aspects of the method 90 may be executed by the one or more processors of the one or more controllers 20 and/or the one or more processor 38 of the one or more servers 38. For example, the optimization module 32 may be executed by the model-based controller 20 in direct communication with components 18 of the process 10 and/or the process 10, and the UAMs 30 and/or the various model modules 28 may be executed on the same controller 20, one or more other controllers 20, and/or one or more servers 36. Additionally, although the following method 90 describes a number of operations that may be performed, it should be noted that the method 90 may be performed in a variety of suitable orders and all of the operations may not be performed.

Referring now to the method 90, the processor 24 and/or 38 may identify input, output, and/or state data for the process 10 (process block 92). For example, as depicted in the open modeling architectures 68 above, the inputs, outputs, and/or state data may be fed into one or more model modules 28 (e.g., parameter models 76, parametric hybrid models 74) executing on the processor 24 and/or 38. The processor 24 and/or 38 may update the parameter models 76 using the input, output, and/or state data (process block 94). For example, the data may be provided to the parameter models 76 as input and the parameter models 76 may output updated parameter information to one of the UAMs 30 that resides between the parameter models 76 and the parametric hybrid models 74. In some embodiments, the inputs and outputs of the parameter models may be sent to adaptation module 80, as described above. It should be understood that the parameter models 76 may be independently maintained by different entities and the specific details regarding the models may be hidden from other aspects of the control system 12.

The UAM 30 being executed by processor 24 and/or 38 that interfaces with the parameter models 76 and the parametric hybrid models 74 may adapt the output from the parameter models 76 and store the inputs and outputs of the UAM 30 in the database 34 (process block 96). In some embodiments, adapting the parameter models 76 output may include converting the output into a form that is readable by the parametric hybrid models 74 that use the output. Further, adapting the output may include generating an internal representation of the model using the inputs to the parameter models 76 and/or the output, which may be one or more data points, in the UAM 30 without actually having access to the parameter model 76 in the model module 28. It should be noted that the UAM 30 may be called by the parametric hybrid models 74 for updated parameter information based on a request from the optimization module 32.

The processor 24 and/or 38 may also update the appropriate parametric hybrid models 74 with the outputs of the parameter models 76 that are provided via the UAM 30 or that are accessed in the database 24 (process block 98). In some embodiments, when a parameter changes based on input, output, and/or state data, the updated parameter may be provided to the parametric hybrid models 74. Additionally, the parametric hybrid models 74 may be updated periodically (e.g., a certain amount of time) with the latest parameter information by the processor 24 and/or 38 executing a function call to the UAM 30 to provide parameter output, receiving the latest parameter information when the parameter models 76 finish computations, and/or requesting the data from the database 24. Using the updated parameter information, the parametric hybrid models 74 may execute respective computations and provide output to the UAM 30 residing between the model modules 24 including the parametric hybrid models 74 and the optimization module 32. As discussed above, certain of the parametric hybrid models 74 may include complex computations, such as a parametric difference equation that captures the dynamic relationship between an input/output pair in a multi-input/multi-output system. As such, the computations may take a prolonged amount of time to converge. Nevertheless, as discussed above, the optimization module 32 may be unaffected by the length of time and/or even the failure of the model modules 28 to converge because the execution frequency of the optimization module 32 is decoupled from the execution frequency of the model modules 28 in the disclosed open modeling architecture 68.

To this end, the process 10 may be accurately represented by a set of differential equations. However, integrating a set of complex differential equations may take an inordinate amount of time for a controller 20 to process when real-time decision making is desired. Thus, as should be appreciated, the presently disclosed open modeling architecture 68 solves this challenge by separating steady state and dynamic models via the parametric hybrid models 74 that use a parametric system where each parameter can be represented as parameter models 76 (e.g., functions). The control system 12 avoids integration of the complex equations at the optimization module 32 run on a controller 20 and/or a server 36 and lets owners of the model modules 28 maintain and represent non-linear gain and non-linear dynamics. In this way, complex models (e.g., neural networks) may be inserted into the open modeling architecture 68 and the models may be described by a system of equations that need to be solved.

In some embodiments, the complex models may process slowly and may not be run all the time. For example, the control system 12 may determine that certain manipulated variable setpoints are causing responses outside the range of the approximation of the process 10, and the optimization module 32 may call the UAM 30 to call the model modules 28 for data points that may be fed to the optimization engine 70 to generate a new approximation of the surface in another region. As such, the controller 20 and/or server running the optimization module 32 may not have to wait on the model modules 28 to complete because the open modeling architecture 68 moves the equations represented by the model modules 28 outside of the main control loop. When the equations are needed for new data, the appropriate model modules 28 may be called (e.g., via the UAMs 30). Further, the model modules 28 may take their time to execute and, when the model modules 28 have determined output, the output may be fed to the optimization module 32. It should be understood that using this architecture 68, in the case of model module 28 failure, the controller 20 and/or server 68 running the optimization module 32 may continue running and be unaffected by the failure.

The UAM 30 being executed by processor 24 and/or 38 that interfaces with the parametric hybrid models 74 and the optimization module 32 may adapt the output from the parametric hybrid models 74 and store the inputs and outputs of the UAM 30 in the database 34 (process block 100). That is, the UAM 30 may receive input (e.g., the output data points from the parameter models 76) and perform some adaptation of the input to generate output to send to the parametric hybrid models 74. In some embodiments, adapting the parametric hybrid models 74 output may include converting the output into a form that is readable by the optimization model 32 that use the output. Further, adapting the output may include generating an internal representation of the parametric hybrid model 74 used to generate the output, which may be one or more data points, in the UAM 30 without actually having access to the parametric hybrid model 74 in the model module 28. Further, as described below, adapting the output of the parametric hybrid model 74 may include performing a systematic model order reduction on a particular parametric hybrid model 74 (e.g., a parametric state-space model of high order). In some embodiments, adapting the output may also include generating optimized code to send to the optimization engine 70. It should be noted that, in certain instances, the UAM 30 may be called by the optimization module 32 for updated information. For example, when the optimization engine 70 determines that the search has reached points outside of an approximated surface of the process response, the optimization engine 70 may call the parametric hybrid models 74 for updated process response data points.

In some embodiments, when output of the parametric hybrid models 74 change based on an updated parameter, the updated output may be provided to the optimization module 32 (e.g., optimization engine 70 and/or COPM 72). Additionally, the COPM 72 74 may be updated periodically (e.g., a certain amount of time) with the latest process response information by the processor 24 and/or 38 executing a function call to the UAM 30 to provide parametric hybrid model 24 output, receiving the latest parametric hybrid model 74 output when the models 74 finish computations, and/or requesting the data from the database 24. Using the updated process response information from the parametric hybrid models 74, the optimization module 32 may generate a computationally optimized process model (COPM) 72 (process block 102).

The processor 24 and/or 38 executing the optimization module 32 may use the optimization engine 70 to simulate control actions (e.g., manipulated variable setpoints) performing a search using an objective function (e.g., cost function) with the COPM 72 (process block 104). It should be understood that the COPM 72 may execute more efficiently that the parametric hybrid models 74 to provide results in near real-time so the optimization engine 70 can find manipulated variable setpoints that provide a desired response to apply to control the process 10. Once control actions are found that, for example, minimize the objective function using the COPM 72, then the control actions may be selected by the optimization engine 70 (process block 106). Then, the selected control actions may be performed by the processor 24 and/or 38 to control the process 10 and/or components 18.

Figure 7:
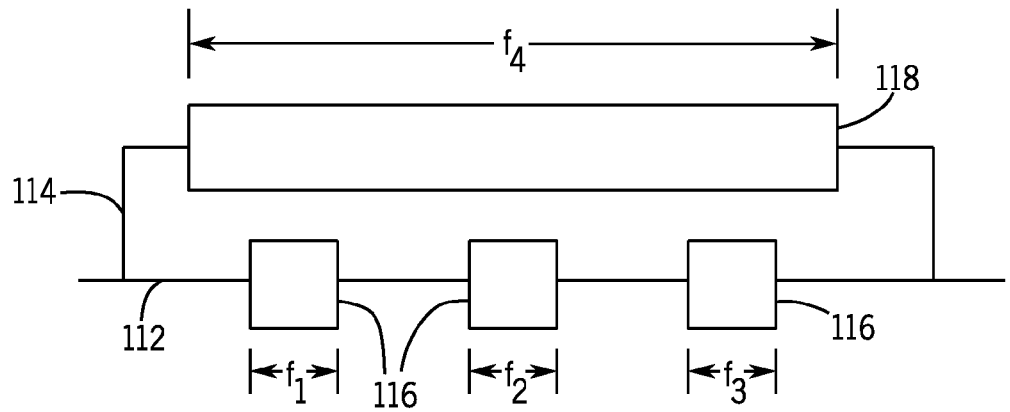
FIG. 7 is a block diagram of decoupled execution frequency of the optimization engine and the model modules, in accordance with embodiments presented herein.

FIG. 7 is a block diagram of decoupled execution frequency of the optimization engine 70 and the model modules 28, in accordance with embodiments presented herein. As depicted, the main control loop for the control system 12 is represented by line 112. The line 114 may represent a function call to the UAM 30 to obtain updated process response information from the parametric hybrid models 74. Each block 116 on the main control loop 112 may represent the optimization engine 70 executing simulations using the COPM 72 including process inputs, outputs, and/or states to find manipulated variable setpoints (e.g., control actions) that result in a desired process response and applying the found manipulated variable setpoints to the process 10. As illustrated, the frequencies $f_1$, $f_2$, and $f_3$ of the three computation blocks 116 is relatively short, thereby allowing near real-time control of the process 10 using the optimization module 32. In some embodiments, the computation blocks 116 may be executed when a process input, output, and/or state changes so the control system 12 can control the process 10 appropriately.

As should be noted, the model module loop 114 is decoupled from the main control loop so the computation blocks 116 continue to function. That is, the computation block 118 of the called model module 28 may process on the controller 20 or server 36 running the called model module 28 in the background while the computation blocks 116 of the main control loop continue to function. Thus, the optimization engine 70 may run at a first frequency and a model module 28 may run at a second frequency that may be longer than the first frequency. For example, if there are a complex set of equations to solve to define the parametric hybrid model 74, the computation block 118 may be run for a certain period of time, such as 10 minutes, and provide updated output every 10 minutes while the computation blocks 116 that control the process 10 may be run at a frequency of 1 second, for example. For the 10 minutes before the controller 20 receives the update from the model module loop 114, the computation blocks 116 use old values of the models. When the computation blocks 116 receive the update, a new set of nodes for the COPM 72 may be calculated.

Accordingly, in some embodiments, the computation block 118 may include a relatively long execution frequency $f_4$ when complex equations (e.g., differential equations) are executed. However, the execution frequency $f_4$ of the computation block 118 for the model module loop 114 may be decoupled from the execution frequencies $f_1$, $f_2$, and $f_3$ of the computation blocks 116 on the main control loop 112. As such, a large number of equations or complex computations may be used by the model-based controller 20 without the computationally-expensive online computations negatively impacting the execution frequency of the main control loop 112. When the computation block 118 completes, the model module loop 114 may return the output to the optimization module 32 running on the main control loop 112 so the output may be incorporated in a new approximation of a surface.

Figure 8:
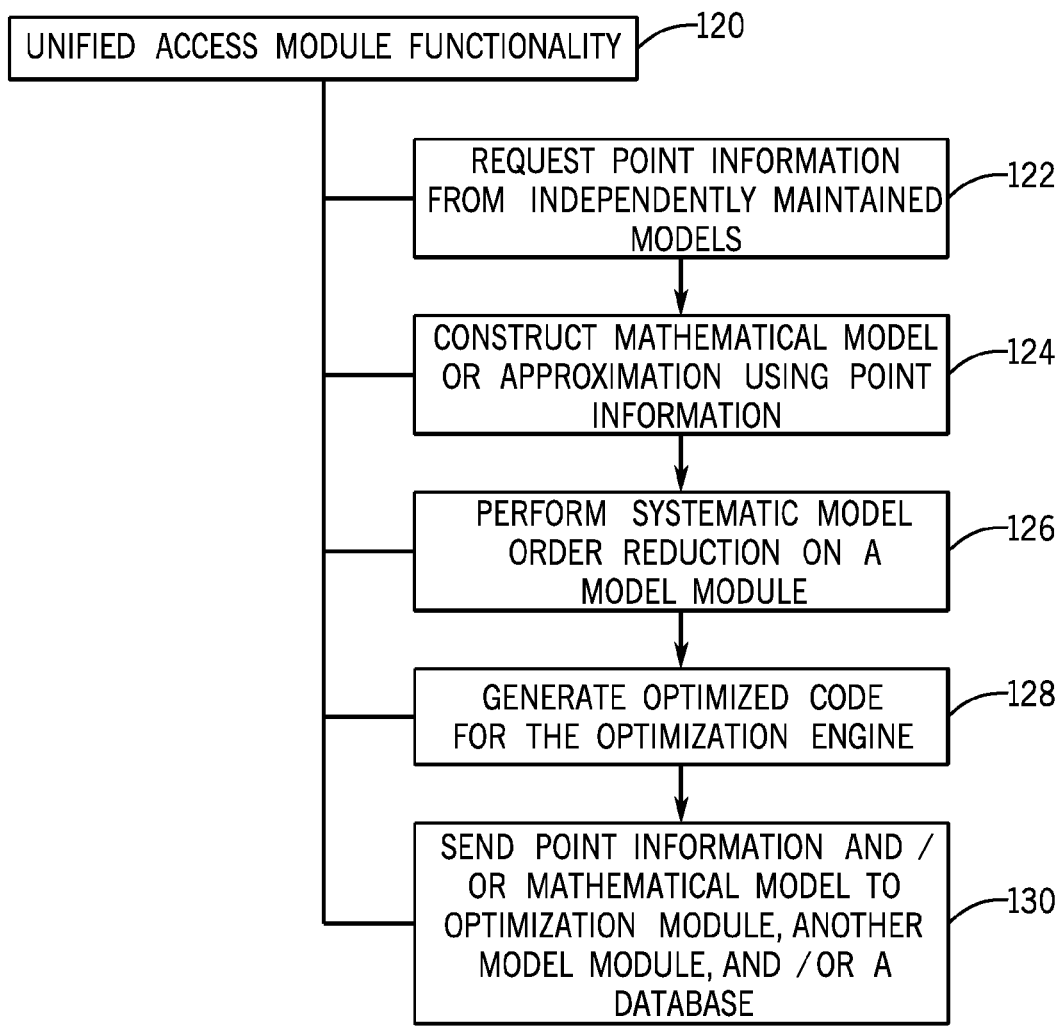
FIG. 8 is a schematic diagram of various functionality of one or more unified access modules (UAMs), in accordance with embodiments presented herein.

FIG. 8 is a schematic diagram of various functionality 120 of one or more unified access modules (UAMs) 30, in accordance with embodiments presented herein. As previously discussed, the open modeling architecture 68 may include two UAMs 30, although any suitable number may be used (e.g., 1, 2, 3, 4) based on the implementation. A first UAM 30 may interface with the model modules 28 including the parameter models 76 and the model modules 28 including the parametric hybrid models 76 and a second UAM 30 may interface with model modules 28 including the parametric hybrid models 74 and the optimization module 32. In some embodiments, the UAMs 30 ensure that when there is a change to a parameter model 76 and/or a parametric hybrid model 74, the approximation that is produced for runtime computation is consistent with the new information. As previously discussed, the parameter models 76 and the parametric hybrid models 74 may only integrate with the UAMs 30 and not the optimization module 32.

A first functionality 122 of the UAM functionality 120 may include requesting point information from the independently maintained model modules 28. For example, the COPM 72 may make a function call to the UAM 30 and pass certain process inputs to the function. In response, the function may pass the inputs to the appropriate model module 28, which executes the model and returns the outputs. For example, the model modules 28 may return point information for any suitable number of points (e.g., 2, 3, 4, 5).

A second functionality 124 of the UAM functionality 120 may include constructing a mathematical model using the point information provided from the independently maintained parameter models 76 and/or the parametric hybrid models 74. Based on function call for point information discussed above, the UAM 30 may use the returned point information and construct an approximation of the surface or the model (e.g., parametric hybrid or parameter) used by the model module 28 called using the point information. For example, the UAM 30 may create an internal representation of the parametric hybrid model 74 that may be consistent with the quality of the model originally defined. However, the UAM 30 may not have access to exactly how the original parametric hybrid model 74 is defined in the model module 28 because it is independently owned and maintained, but for the predictions of a number of points in time, the UAM 30 may produce a reasonable approximation that can be used in a computation. In some embodiments, the approximation may be efficient for fast computations in real-time.

A third functionality 126 of the UAM functionality 120 may include performing systematic model order reduction on a model provided by the parameter models 76 and/or the parametric hybrid models 74. In some embodiments, the UAMs 30 may adapt high fidelity models that are computationally inefficient to a model that is computationally efficient or from a poorly defined model (e.g., insufficient constraints) to a well defined model that is manageable for decision making. Further, the UAMs 30 may reduce the size of the models by performing an optimized model reduction. For example, the UAM 30 may receive a 100 by 100 state space model and reduce the model to a 10 by 10 model, which may be more efficient. Additionally, performing the reduction may bound the error because the amount of order reduction may be identified during the approximation.

A fourth functionality 128 of the UAM functionality 120 may include generating optimized code for the optimization engine 70. In some embodiments, the optimized code may include specialized code that is computationally efficient to be used with the COPM 72. For example, the optimized code may represent the model in the COPM 72. Thus, instead of generating a general solver that is comprehensive of the problem to be solved and is inefficient, the optimized code is tailored specifically to the COPM 72 to operate more efficiently. In some instances, the UAM 30 may generate the optimized code to narrow the search performed by the code to the specific surface approximation using the process response output and/or point information from the parametric hybrid models 74.

A fifth functionality 130 of the UAM functionality 120 may include sending point information and/or a mathematical model to the optimization module 32 (e.g., COPM 72), another model module 28 (e.g., parametric hybrid model 74), and/or the database 34. Generally, the point information and/or the model may be sent by the UAMs 30 to the optimization module 32 in several scenarios. For example, in one scenario, the UAMSs 30 may provide the information upon request when the optimization module 32 (e.g., optimization engine 70 and COPM 72) systematically checks in with the UAMs 30 to determine whether the UAMs 30 have an updated point information. In another scenario, the UAMs 30 may raise a flag in a certain register that indicates that updated point information is ready and the optimization module 32 and/or model module 28 may recognize the flag and request the UAMs 30 to send the information. In another scenario, the UAMs 30 may cause a system interrupt that raises a flag that triggers the information to be sent to the optimization module 32 and/or the model modules 28. Additionally, as described below, in another scenario, the UAMs 30 may send updated point information when a tolerance change in the output of the parameter models 76 and/or parametric hybrid model 74 has occurred. The flow diagram below further describes scenarios in which the optimization module 32 receives updated data points from the UAMs.

Figure 9A:
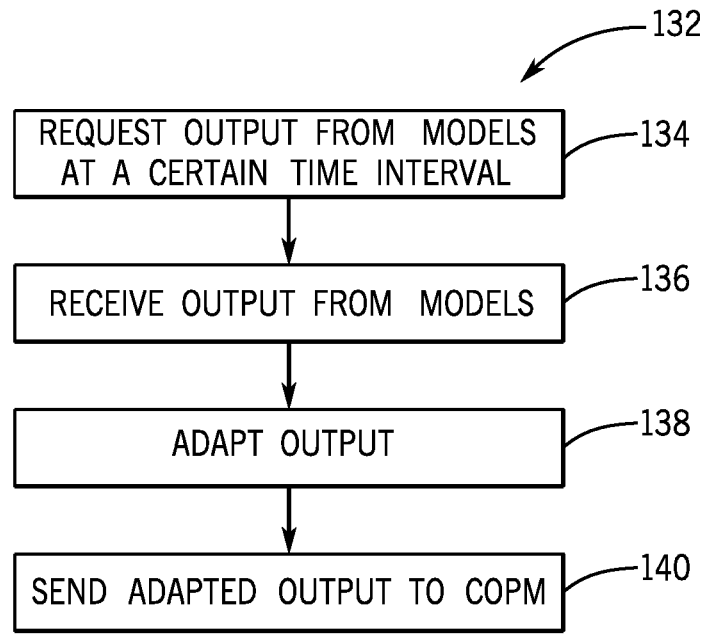
FIGS. 9A-9C are flow diagrams of methods for the unified access modules (UAMs) requesting, receiving, and/or sending output from the model modules, in accordance with embodiments presented herein.
Figure 9B:
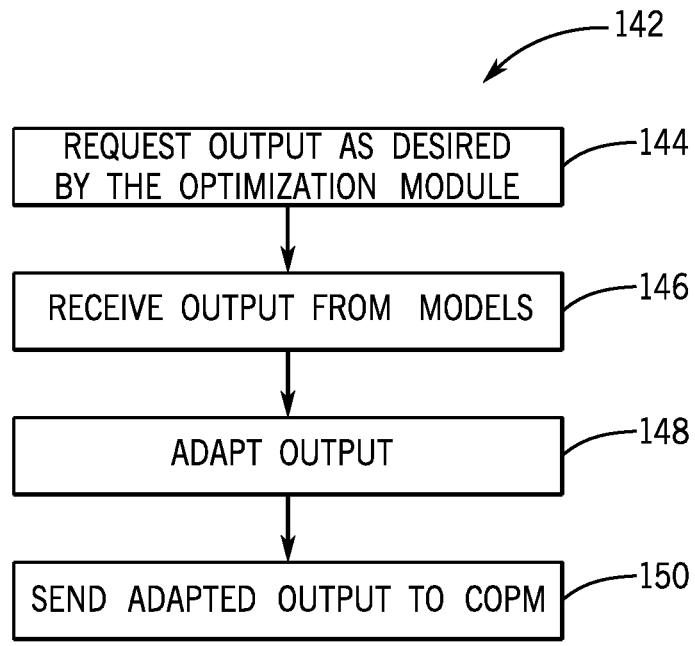
Figure 9C:
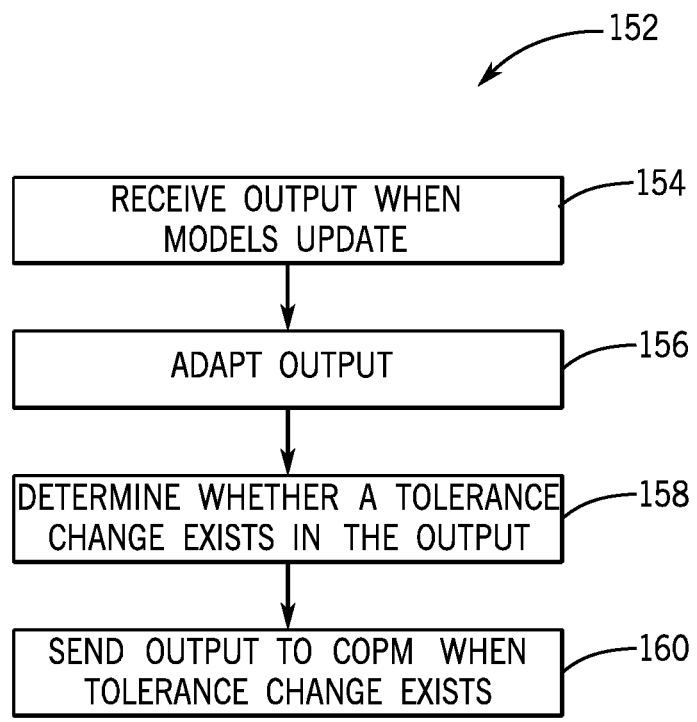

FIGS. 9A-9C are flow diagrams of methods 132, 142, and 152 for the unified access modules (UAMs) 30 requesting, receiving, and/or sending output from the model modules 28, in accordance with embodiments presented herein. The methods 132, 142, and 152 may be implemented as computer instructions stored on one or more tangible, non-transitory mediums (e.g., memory 26 or 40). As previously discussed, the UAMs 30 may be executed on the controller 20 or the server 36 and, thus, either processor 24 of the controller 20 or processor 38 of the server 36 may execute the instructions depending on implementation. It should be understood that the methods 132, 142, and 152 may be indicative of the execution frequencies of the parameter models 76 and/or the parametric hybrid models 74.

Starting with FIG. 9A which is a flow diagram of the method 132 for the UAMs 30 requesting output from the model modules 28 based at least on time. For example, the processor 24 or 38 may request output from the model modules 28 at a certain time interval (e.g., every 1, 2, 3, 4, 5, 10, 15, or 20 minutes) (process block 134). In some embodiments, the time interval may be longer for model modules 28 that include a complex set of equations (e.g., differential equations) to provide the equations sufficient time to converge on a solution. In some embodiments, the time interval that the UAMs 30 request output from the models may be the same as the execution frequency of the optimization module 32. The processor 24 or 38 may receive the output from the models (process block 136) and adapt the output (process block 138), as described above. Further, the processor 24 or 38 may send the adapted output to the COPM 72 (process block 140), which may use the adapted output to generate a new approximation of the surface.

FIG. 9B is a flow diagram of the method 142 for the UAMs 30 requesting output from the model modules 28 on demand. Thus, the processor 24 or 38 may request output from the model modules 28 as desired by the optimization module 32 (process block 144). In some embodiments, the optimization engine 70 may run with an existing surface using the COPM 72. When the optimization engine 70 enters an unknown area not covered in the surface, the optimization engine 70 may request that the UAMs 30 retrieve the updated information. The processor 24 or 38 may receive the output from the models (process block 146) and adapt the output (process block 148), as described above. Further, the processor 24 or 38 may send the adapted output to the COPM 72 (process block 150), which may use the adapted output to generate a new approximation of the surface.

FIG. 9C is a flow diagram of the method 152 for the UAMs 30 receiving output from the model modules 28. For example, the processor 24 or 38 may receive the output when the model modules 28 are updated (process block 154) and may adapt the output (process block 156), as described above. For example, when any of the parameter models 76 and/or parametric hybrid models 74 change due to new process input, output, or state, for example, the UAMs 30 may receive updated point information and/or a model from the models 74 and/or 76. Thus, in some embodiments, the execution frequency of the models is dependent upon the process inputs, outputs, and/or states. The UAMs 30 may determine whether a tolerance change (e.g., the updated information is more than a threshold difference than prior information) exists in the output (process block 158). Further, the processor 24 or 38 may send the adapted output to the COPM 72 (process block 160). In some embodiments, the COPM 72 may use the adapted output to generate a new surface approximation.

It should be noted that the methods 50, 60, 90, 132, and/or 142 may be performed using the processor 24 that is part of the controller 20 and/or the processor 38 that is part of the server 36. The controller 20 and the computing server 36 are configured to execute instructions that enable each device to interact with the process 10 and/or the components 18. As such, the controller 20 and the server 36 are tied to particular machines to assist in the management and control of the process. Moreover, it should be noted that the data received by the control system such as process inputs, outputs, and/or states may be transformed when being processed into a parameter for a parametric hybrid model 74 and/or into a manipulated variable setpoint (e.g., control action) that is applied to control operation of the process 10. For example, the data received by the model modules 28 may be transformed into data points that are further transformed into an approximation of a surface for a process 10. The surface may be used to determine one or more control actions that physically control the operation of the process 10 and/or components 18.

Technical effects of the embodiments described herein include using a model-based controller 20 to make decisions in near real-time by decoupling the execution frequency of the optimization engine 70 running on the model-based controller 20 from the execution frequencies of various model modules 28 used to provide data about aspects of the process response. Further, the disclosure enables owners of the model modules 28 to maintain the privacy of and control over their respective modules 28, thereby enabling each model module 28 to be written in potentially different modeling languages. In some embodiments, the open modeling architecture 68 may be enabled through the use of unified adapter modules (UAMs) 30 that interface between the various model modules 28 and/or the optimization module 32. The UAMs 30 may serve as an abstraction layer that integrates the model modules 28 together and/or with the optimization module 32. As a result of some of the embodiments, the models used in the modules 28 may be allowed to take their time and process to convergence while the controller 20 continues making decisions in near realtime. Further, the quality of the model modules 28 may be enhanced because the owners who may be experts in the particular fields are enabled to program the modules 28 in the most appropriate modeling language (e.g., not forced to use a uniform modeling language for all modules 28).

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A system for performing an industrial process, comprising:
an automation component comprising an actuator configured to operate to facilitate performing the industrial process;
one or more sensors that, in operation, are configured to measure an operational parameter of the actuator;
a control system comprising one or more processors communicatively coupled to the automation component and the one or more sensors, wherein the one or more processors are configured to:
execute an optimization module comprising an optimization engine configured to determine a control action to be implemented by the actuator to facilitate performing the industrial process based at least in part the operational parameter of the actuator, an objective function, and a computationally optimized process;
execute a plurality of model modules comprising mathematical representations of a response or parameters of the industrial process;
execute a first unified access module (UAM), wherein the first UAM is configured to interface between a first subset of the plurality of model modules and the optimization module and configured to adapt output of the first subset for consumption by the optimization module to hide implementation details of the plurality of model modules from and make inaccessible to the optimization module;
execute a second UAM, wherein the second UAM is configured to interface between a second subset of the plurality of model modules and the first subset of the plurality of model modules and configured to adapt output of the second subset for consumption by the first subset of the plurality of model modules; and
control performance of the industrial process by instructing the actuator to implement the control action determined by executing the optimization module; and
an execution frequency of the plurality of model modules is decoupled from an execution frequency of the optimization module; and
the first UAM is configured to interface between the first subset of the plurality of model modules and the optimization model based on the execution frequency of the first subset and the execution frequency of the optimization model.

2. The system of claim 1, wherein the optimization module is configured to request updated process response information from the plurality of model modules when an area outside of a control horizon of the control action is reached.

3. The system of claim 1, wherein the mathematical representations are decomposed into steady-state and dynamic models wherein the steady-state and dynamic models are represented in different modeling languages.

4. The system of claim 3, wherein the steady-state models use equations to describe input-output relationships of the industrial process.

5. The system of claim 3, wherein the steady-state and dynamic models comprise parametric hybrid models including parameters that are defined as parameter models, wherein at least one of the parameter models is represented in a different modeling language than one of the parametric hybrid models or the other parameter models.

6. The system of claim 3, wherein at least one parametric hybrid model comprises a transfer function representing input-output relationships of the industrial process, and the parameter models used by the transfer function comprise a steady-state gain function represented as an empirical model and a residence time for a first ordered system.

7. The system of claim 6, wherein the empirical model comprises a neural network.

8. The system of claim 1, wherein the first UAM is configured to perform model reduction on the output of the plurality of model modules, wherein the model reduction comprises an explicit optimization to reduce model order.

9. The system of claim 1, wherein the first UAM is configured to perform automatic code generation to generate computationally enhanced code based on the output of the first subset of the plurality of model modules, wherein the computationally enhanced code is used by the optimization engine to enhance operation of the optimization engine during runtime.

10. The system of claim 1, wherein the optimization module, each of the plurality of model modules, and at least the first UAM run on a different core of a single processor, and the single processor is disposed in a controller.

11. The system of claim 1, wherein the optimization module, each of the plurality of model modules, and at least the first UAM run on a dedicated processor of the one or more processors, and the dedicated processor running the optimization module and the dedicated processors running the one or more UAMs are disposed in a controller, and the dedicated processors running each of the model modules are disposed on one or more servers in communication with the controller.

12. A method for controlling operation of an industrial process, comprising:
receiving, via a control system, an operational parameter of an actuator measured by one or more sensors, wherein the actuator operates to facilitate performing the industrial process;
executing, via the control system, an optimization module comprising an optimization engine configured to determine a control action to be implemented by the actuator to facilitate performing the industrial process based at least in part on the operational parameter of the actuator, an objective function, and a computationally optimized process model;

executing, via the control system, a plurality of model modules comprising mathematical representations of a response or parameters of the industrial process;

executing, via the control system, a first unified access module (UAM), wherein:

the first UAM is configured to interface between a first subset of the plurality of model modules and the optimization module based on an execution frequency of the first subset of the plurality of model modules and an execution frequency of the optimization model;

the execution frequency of the first subset of the plurality of model modules and the execution frequency of the optimization model are decoupled; and the first UAM is configured to adapt output of the first subset of the plurality of model modules for consumption by the optimization module to hide implementation details of the plurality of model modules from and make inaccessible to the optimization module;

executing, via the control system, a second UAM, wherein the second UAM is configured to interface between a second subset of the plurality of model modules and the first subset of the plurality of model modules and configured to adapt output of the second subset for consumption by the first subset of the plurality of model modules; and controlling, via the control system, performance of the industrial process by instructing the actuator to implement the control action determined by executing the optimization module.

13. The method of claim 12, wherein the first subset comprises parametric hybrid models including one or more parameters and the second subset comprises parameter models that represent the one or more parameters, and the parametric hybrid models and the parameter models are written in any modeling language.

14. The method of claim 13, comprising:

modifying, via a first adaptation module, a structure of the parametric hybrid models or the one or more parameters included in the parametric hybrid models, and modifying, via a second adaptation module, the parameter models as a function of current values, predicted values, or both, for process inputs, outputs, states, or some combination thereof.

15. The method of claim 13, comprising receiving, via the parameter models, vectors including process inputs, outputs, states, or some combination thereof.

16. The method of claim 12, comprising storing, via the first UAM, inputs and outputs of the UAM in a database, and retrieving, via the UAM, inputs and outputs of the UAM from the database.

17. A tangible, non-transitory, computer-readable medium storing instructions that, when executed by a processor, cause the processor to:

execute an optimization module comprising an optimization engine configured to determine a control action to be implemented by an actuator to facilitate performing an industrial process based at least in part on an operational parameter of the actuator measured by one or more sensors, an objective function, and a computationally optimized process model;

execute a plurality of model modules comprising mathematical representations of a response or parameters of the industrial process; and execute a first unified access module (UAM), wherein the first UAM is configured to interface between a first subset of the plurality of model modules and the optimization module and configured to adapt output of the first subset of the plurality of model modules for consumption by the optimization module to hide implementation details of the plurality of model modules from and make inaccessible to the optimization module;

execute a second UAM, wherein the second UAM is configured to interface between a second subset of the plurality of model modules and the first subset of the plurality of module modules and configured to adapt output of the second subset for consumption by the first subset of the plurality of model modules;

control performance of the industrial process by instructing the actuator to implement the control action determined by executing the optimization module;

the instructions, when executed by the processor, cause the processor to decouple an execution frequency of the optimization module from execution frequencies of the plurality of model modules, and implementation details of the plurality of model modules are secured from other model modules and the optimization module; and the first UAM is configured to interface between the first subset of the plurality of model modules and the optimization model based on the execution frequency of the first subset and the execution frequency of the optimization model.

18. The computer-readable medium of claim 17, wherein the first UAM is configured to make a request to the plurality of model modules based on a request from the optimization module, after a certain time period has elapsed, when a flag is set by the plurality of model modules when the output is ready, at the same execution frequency of the optimization module, or some combination thereof.

19. The computer-readable medium of claim 17, wherein the first UAM is configured to provide adapted output to the optimization module and the second UAM is configured to provide adapted output to the first subset when there is a tolerance change in the output from the first subset or from the second subset as compared to previous output.

20. The computer-readable medium of claim 17, wherein the mathematical representations are decomposed into steady-state and dynamic models that comprise parametric hybrid models including parameters that are defined as parameter models, wherein at least one of the parametric hybrid models or parameter models is represented in a different modeling language than the other parametric hybrid models or parameter models.

21. The computer-readable medium of claim 17, wherein at least one of the mathematical representations of the response comprises a parametric hybrid model including parametric input-output or state space dynamic models in a form of a system of continuous differential equations or discrete difference equations.

* * * * *